Figure 1:
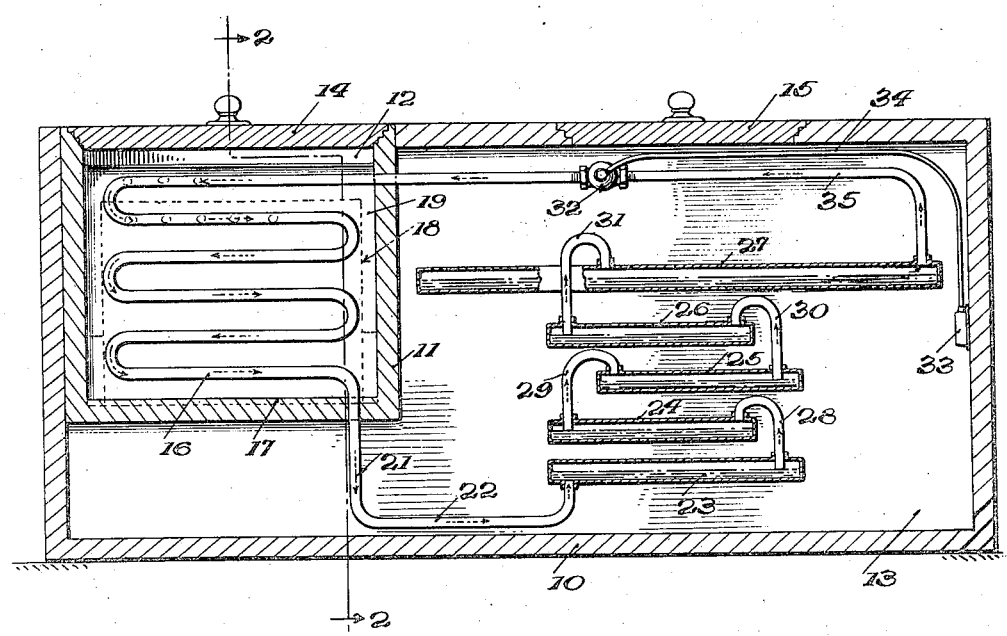

June 18, 1935.  W. W. CARSON. JR  2,005,611
DRY ICE REFRIGERATING SYSTEM
Filed June 6, 1933

Inventor
William W. Carson, Jr.
By Cameron, Kerkam & Sutton
Attorneys

Patented June 18, 1935

2,005,611

UNITED STATES PATENT OFFICE 2,005,611

DRY ICE REFRIGERATING SYSTEM

William W. Carson, Jr., Knoxville, Tenn., assignor to The Fulton Sylphon Company, Knoxville, Tenn., a corporation of Delaware Application June 6, 1933, Serial No. 674,573

12 Claims. (Cl. 62—91.5)

This invention relates to a method and apparatus for producing refrigerating effects with the aid of dry ice, as solid carbon dioxide.

Various methods and means have heretofore been proposed for using dry ice in the production of refrigerating effects. Not only has dry ice in blocks been disposed around or directly in the chamber or space to be cooled, but various systems have heretofore been proposed wherein dry ice has been utilized as a cooling means for a circulating medium. Thus the space to be refrigerated has been provided with a system for circulating a suitable liquid therethrough, said system also including a coil positioned in a separate compartment wherein the dry ice is disposed, and said system being completely filled with said liquid to be cooled in the dry ice compartment and then circulated by gravity through the piping disposed in the space to be refrigerated. Also a system of similar construction and arrangement has been employed but utilizing the coil in the dry ice compartment as a condensing coil and the piping within the compartment to be refrigerated as an evaporator.

The latter two types of systems have permitted the use of a thermostatic control of the circulating liquid or vapor, whereas the disposition of the dry ice around or directly in the compartment to be refrigerated has been characterized by a lack of temperature control. But with all of the types of method and apparatus for utilizing dry ice as a cooling medium heretofore proposed, the refrigerating effect has been characterized by a pronounced stratification of temperature, i. e. producing layers of air of different temperatures, in the chamber to be refrigerated. If the dry ice is disposed to directly cool the chamber to be refrigerated, the cooler air naturally seeks the bottom of said chamber; if a cooling fluid is circulated through the chamber to be refrigerated, whether with or without vaporization of said fluid in the part of the system disposed in said chamber, the maximum cooling effect has heretofore been obtained adjacent the bottom of said chamber because of the dependence on gravitational flow of the liquid from the coil subjected to the dry ice into the piping in the chamber to be refrigerated. Therefore, stratification or the existence of air layers of different temperatures has resulted, presenting a major difficulty and problem in the use of dry ice for producing refrigerating effects because of the consequent loss in efficiency, since the top of the chamber to be refrigerated must be held at as low a temperature as the maximum permissible while the lower portions of said chamber are maintained at a temperature which is unnecessarily low.

It is an object of this invention to provide a refrigerating method and apparatus utilizing dry ice in which there is a minimum amount of temperature difference between the top and bottom of the chamber to be refrigerated.

Another object of this invention is to provide a method and apparatus of the type characterized whereby the maximum cooling action is obtained at the top instead of at the bottom of the chamber to be refrigerated Another object of this invention is to provide a method and apparatus of the type characterized which is simple, effective and efficient, and whereby dry ice may be satisfactorily used to secure desired refrigerating effects by means which are inexpensive and compact, which are economical in the use of dry ice, and which facilitate temperature regulation to maintain a substantially uniform temperature.

The invention is capable of receiving a variety of expressions, one of which is shown in the accompanying drawing, but it is to be expressly understood that the drawing is for purposes of illustration only, and is not to be construed as a definition of the limits of the invention, reference being had to the appended claims for that purpose.

Figure 2:
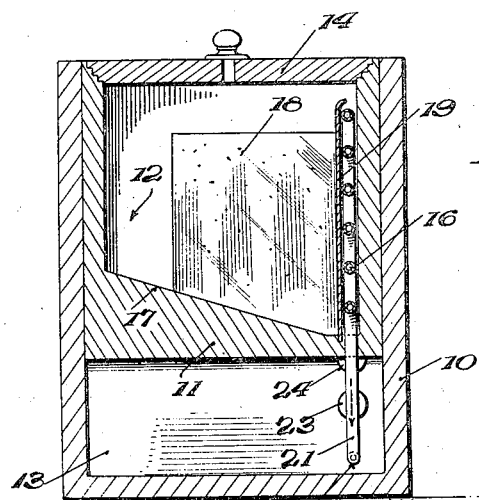

Referring in detail to the drawing, wherein the same reference characters are employed to designate corresponding parts in the respective figures, Fig. 1 is a schematic vertical section of a refrigerating box embodying the method and apparatus of the present invention; and Fig. 2 is a transverse section on the line 2—2 of Fig. 1.

In the form shown, 10 designates a cabinet of any suitable size, construction and material and provided interiorly with suitable partitions 11 to divide the contained space into a chamber 12 which constitutes a dry ice compartment and a chamber 13 which is to be refrigerated and which may be used for any suitable purpose. Suitable lids or covers 14 and 15 are diagrammatically indicated for gaining access to said chambers.

Disposed within the chamber 12 is a coil 16 of any suitable size and material, which constitutes a condenser for a vaporizable cooling liquid of any suitable character, such as methyl chloride for example. The bottom of chamber 12 is preferably provided with an inclined surface 17, sloping toward the coil 16, so that a block of dry ice 18 may be disposed therein, and as it diminishes, it will slide downwardly into proximity to said coil 16. In order to prevent injury to said coil 16, a protector 19 of any suitable form and material is preferably mounted in said chamber closely adjacent to said coil 16, and constitutes a shield therefor as appears clearly from Fig. 2.

Coil 16 communicates through the vertical leg 21 of connection 22 with the lowermost of a series of evaporators 23, 24, 25, 26, 27, etc., which may be of any suitable form, as tubes, covered trays, etc., and of any suitable size, construction and material. Connecting each pair of adjacent evaporators is a lift tube 28, 29, 30, 31, etc., each of said lift tubes projecting into the lower evaporator for a portion of its vertical dimension, so that the vaporizable liquid in each evaporator, as it rises therein, will seal the bottom of the lift tube, and trap vapor between the free surface of the liquid and the top of the evaporator. Each of said lift tubes preferably communicates with the next evaporator at or adjacent the top thereof as illustrated. The vertical height between the respective evaporators may vary within wide limits, and the lift tubes may be of any suitable diameter, the smaller the diameter the greater the efficiency of the lift tubes and therefore the greater the distance which may be permitted between succeeding evaporators. Each lift tube constitutes a gas lift pump and, owing to the vapor space above the liquid in each evaporator, said evaporators and lift tubes can operate independently. The vaporizable liquid which constitutes the refrigerant is thereby lifted from one evaporator to the next by means of the action of the escaping bubbles of vapor elevating successive slugs of liquid.

The lower evaporator 23 should be below the bottom of the condenser coil 16, so that as liquid is condensed in said coil it will flow downward to said evaporator 23. The top evaporator, here designated 27, is preferably the largest of the series and is disposed near the top of the chamber to be refrigerated. The intermediate evaporators 24, 25, 26 may be of any suitable number, depending upon the size of the chamber and the length appropriate for the respective lift tubes, and together with lowermost evaporator 23, the evaporators below the large evaporator 27 are preferably short since their chief function is to produce sufficient vapor by evaporation of liquid therein to elevate the main part of the liquid refrigerant to the main evaporator 27 where it is designed to vaporize and produce the principal refrigerating action. The system is charged with sufficient refrigerant so that each evaporator will be filled up to the lower end of the lift tube communicating therewith, with sufficient additional liquid in the connections 21, 22, and condenser coil 16 to provide a static head that is at least sufficient to assure rise of the liquid through one lift tube.

Communicating with the upper evaporator 27 is a return line 35 leading to the inlet end of the coil 16. Suitably interposed in said system is a thermostatically controlled valve generally indicated at 32. The thermostatic control of said valve may be of any suitable character, here shown as comprising a bulb 33 mounted on the wall of the chamber 13 at a suitable point, illustrated as approximately midway of the height of said chamber, and communicating through a pipe 34 of any suitable character with a valve operating member operatively connected to the valve at 32, shown in pipe 35.

Assuming that dry ice 18 has been disposed in the bunker chamber 12 and that the chamber 13 is above that temperature which it is desired to maintain therein, the thermostatic valve 32 is open and the refrigerating liquid may flow through the system composed of the coil 16, the connections 21 and 22, the series of evaporators 23, 24, 25, etc., with their respective lift tubes 28, 29, 30, etc., to the upper evaporator 27, and thence return through the pipe 35 to the inlet end of the coil 16. As before noted each evaporator is charged with liquid to a level wherein the liquid seals the inlet end of the corresponding lift tube communicating therein. The air within the space 13 warms the several evaporators and causes evolution of vapor therein which collects in the vapor spaces above the liquid surfaces in the evaporators until a slight excess pressure exists therein. As the vapor is restrained from passing backward in the system by reason of the static pressure of the liquid in the vertical pipe 21, the accumulating vapor escapes from each evaporator through the communicating lift tube, carrying slugs of liquid between the respective bubbles of vapor into the evaporator next above. This process is repeated in each evaporator and thus the liquid is progressively raised through the intermediate evaporators until it reaches the principal and larger evaporator 27 which is adjacent the top of the chamber 13. Here the absorption of heat by evaporation is on a larger scale because of the larger size of this evaporator. From the latter evaporator the vapor evolved from the liquid as heat is absorbed from the chamber 13 flows through the return line 35 to the inlet end of the coil 16 where it is condensed and again flows by gravity through the connections 21 and 22 into the lowermost of the series of evaporators. This procedure continues as long as the temperature in the chamber 13 is above that which it is desired to maintain therein.

As the temperature in the chamber 13 approaches that to be maintained therein the thermostat 33 assumes control of the valve 32 and begins to close the same, thereby restricting the circulation of the refrigerant through the system as heretofore described. When the temperature of the chamber 13 finally reaches the predetermined temperature to be maintained therein the thermostat 33 closes the valve 32 and circulation through the system ceases. As soon as the temperature rises above that to be maintained in the chamber 13, the thermostat 33 opens the valve 32 to permit circulation of the refrigerant through the system, and the action above described is resumed.

As the larger and principal part of the evaporator system is disposed at a point high in the chamber to be refrigerated, the tendency of the system is to maintain the upper part of said chamber 13 at the lower temperature, but as the cool air tends to descend by gravity, a substantially uniform and unstratified temperature condition is maintained throughout the chamber 13. By using a sufficient number of evaporators and lifts the main portion of the evaporator system may thus be disposed above the condenser, and this without the use of any mechanical means for pumping or circulating the refrigerant through the system. Hence the stratification, characteristic of dry ice refrigerating systems as heretofore proposed, has been entirely eliminated. The system is one that facilitates thermostatic control from any desired or suitable point within the chamber to be refrigerated, and at the same time the apparatus is simple in construction, inexpensive to manufacture, compact in arrangement, economical in its use of dry ice, and highly efficient in securing and maintaining a substantially uniform temperature condition throughout the chamber to be refrigerated.

While the apparatus illustrated on the drawing has been described with considerable particularity, it is to be expressly understood that the invention is not restricted thereto. The invention is capable of receiving a variety of expressions, as will now be apparent to those skilled in the art, and hence it is to be expressly understood that any suitable apparatus for carrying out the method heretofore described may be employed. Reference is therefore to be had to the claims appended hereto for a definition of the limits of the invention.

What is claimed is:

1. The method of refrigerating a chamber which includes the steps of condensing a vaporizable liquid in heat interchanging relation with solid carbon dioxide or the like, flowing the condensed liquid by gravity to an evaporator in said chamber, absorbing heat from said chamber at a series of vertically distributed levels in said chamber by evaporating some of said liquid at each of said levels while raising unevaporated liquid to the next higher level by the vapor formed at each level until the main portion of said liquid reaches a main evaporator disposed adjacent the upper portion of the chamber to be refrigerated, evaporating the liquid in said upper evaporator to maintain the desired temperature within said chamber, and returning the vapor evolved from said main evaporator to said coil for recondensation.

2. The method of refrigerating a chamber which includes the steps of condensing a vaporizable liquid in heat interchanging relation with solid carbon dioxide or the like, flowing the condensed liquid by gravity to an evaporator in said chamber, absorbing heat from said chamber at a series of vertically distributed levels in said chamber by evaporating some of said liquid at each of said levels while raising unevaporated liquid to the next higher level by the vapor formed at each level until the main portion of said liquid reaches a main evaporator disposed adjacent the upper portion of the chamber to be refrigerated, evaporating the liquid in said upper evaporator to maintain the desired temperature within said chamber, returning the vapor evolved from said main evaporator to said coil for recondensation, and thermostatically controlling the flow of said vapor from said main evaporator to said condensation coil.

3. The method of refrigerating a chamber which includes the steps of condensing a vaporizable liquid in heat interchanging relation with solid carbon dioxide or the like, flowing the condensed liquid by gravity to a level near the bottom of said chamber, abstracting heat from said chamber at each of a series of levels in said chamber by vaporizing some of said liquid at each of said levels and utilizing the vapor bubbles so formed to lift the main portion of the liquid to the next higher level, evaporating the main portion of said refrigerating liquid in a main evaporator disposed at a level near the top of the condenser and returning the vapor evolved in said last named evaporator to the inlet of said condenser.

4. The method of refrigerating a chamber which includes the step of condensing a vaporizable liquid in heat interchanging relation with solid carbon dioxide or the like, flowing the condensed liquid by gravity to a level near the bottom of said chamber, abstracting heat from said chamber at each of a series of levels in said chamber by vaporizing some of said liquid at each of said levels and utilizing the vapor bubbles so formed to lift the main portion of the liquid to the next higher level, evaporating the main portion of said refrigerating liquid in a main evaporator disposed at a level near the top of the condenser, returning the vapor evolved in said last named evaporator to the inlet of said condenser, and thermostatically controlling the return of said vapor from said main evaporator to said condenser.

5. The method of refrigerating a chamber which includes the steps of vaporizing a vaporizable liquid in an evaporator adjacent the top of said chamber, leading the vapor evolved therein to a condenser in heat interchanging relation with solid carbon dioxide or the like, returning the condensed liquid by the action of gravity to an evaporator in said chamber at a level below the bottom of said condenser, and abstracting heat by evaporation at each of a plurality of levels in said chamber while returning the main portion of said liquid to said first-named evaporator by the evolution of vapor bubbles in said liquid at each of said levels.

6. The method of refrigerating a chamber which includes the steps of vaporizing a vaporizable liquid in an evaporator adjacent the top of said chamber, leading the vapor evolved therein to a condenser in heat interchanging relation with solid carbon dioxide or the like, returning the condensed liquid by the action of gravity to an evaporator in said chamber at a level below the bottom of said condenser, and abstracting heat by evaporation at each of a plurality of levels in said chamber while returning the main portion of said liquid to said first-named evaporator by the evolution of vapor bubbles in said liquid at each of said levels, and thermostatically controlling the flow of vapor from said evaporator to said condenser.

7. In a refrigerating system, the combination of a condenser coil, means providing a compartment for said coil and adapted to contain solid carbon dioxide or the like, a chamber to be refrigerated, a main evaporator disposed in said last named chamber adjacent the top thereof, an evaporator adjacent the bottom of said chamber and into which the refrigerating liquid flows from said condenser by gravity, and evaporators intermediate said last named evaporator and said main evaporator and constituting gas lift pumps for elevating said refrigerating liquid from said last named evaporator to said main evaporator.

8. In a refrigerating system, the combination of a condenser coil, means providing a compartment for said coil and adapted to contain solid carbon dioxide or the like, a chamber to be refrigerated, a main evaporator disposed in said last named chamber adjacent the top thereof, an evaporator adjacent the bottom of said chamber and into which the refrigerating liquid flows from said condenser by gravity, evaporators intermediate said last named evaporator and main evaporator and constituting gas lift pumps for elevating said refrigerating liquid from said last named evaporator to said main evaporator, and a thermostatically controlled valve in the conduit connecting said main evaporator with said condenser.

9. In a refrigerating system, the combination of a condenser coil, means providing a compartment for said coil adapted to contain solid carbon dioxide or the like, a chamber to be refrigerated, a main evaporator disposed in said last named chamber adjacent the top thereof, and means within said chamber below the level of said condenser coil and distributed at spaced vertical points of said chamber below said main evaporator for lifting the refrigerating liquid which flows thereinto by gravity from said condenser to said main evaporator by the action of bubbles of vapor evolved by heat absorbed from said chamber.

10. In a refrigerating system, the combination of a condenser coil, means providing a compartment for said coil adapted to contain solid carbon dioxide or the like, a chamber to be refrigerated, a main evaporator disposed in said last named chamber adjacent the top thereof, means within said chamber below the level of said condenser coil and distributed at spaced vertical points of said chamber below said main evaporator for lifting the refrigerating liquid which flows thereinto by gravity from said condenser to said main evaporator by the action of bubbles of vapor evolved by heat absorbed from said chamber, a valve in the conduit connecting said main evaporator and said condenser, and thermostatic means operatively connected to said valve and subjected to the temperature within said chamber.

11. In a refrigerating system, the combination of a condenser coil, means providing a compartment for said coil adapted to contain solid carbon dioxide or the like, a chamber to be refrigerated, a main evaporator disposed in said chamber adjacent the top thereof, and a plurality of auxiliary evaporators below said main evaporator and connected in series therewith, said auxiliary evaporators being relatively small as compared with said main evaporator and the lowermost thereof being disposed below the level of the outlet of said condenser coil whereby the refrigerating liquid will flow thereinto from said coil by gravity and be lifted through said auxiliary evaporators to said main evaporator by vapor evolved in said auxiliary evaporators by heat absorbed from said chamber at vertically distributed points therein.

12. In a refrigerating system, the combination of a condenser coil, means providing a compartment for said coil adapted to contain solid carbon dioxide or the like, a chamber to be refrigerated, a main evaporator disposed in said chamber adjacent the top thereof, a plurality of auxiliary evaporators below said main evaporator and connected in series therewith, said auxiliary evaporators being relatively small as compared with said main evaporator and the lowermost thereof being disposed below the level of the outlet of said condenser coil whereby the refrigerating liquid will flow thereinto from said coil by gravity and be lifted through said auxiliary evaporators to said main evaporator by vapor evolved in said auxiliary evaporators by heat absorbed from said chamber at vertically distributed points therein, and thermostatic means for controlling the flow of the refrigerating liquid through said coil.

WILLIAM W. CARSON, Jr.